US009778743B2

(12) United States Patent
Grant et al.

(10) Patent No.: US 9,778,743 B2
(45) Date of Patent: Oct. 3, 2017

(54) GAMING DEVICE HAVING A HAPTIC-ENABLED TRIGGER

(71) Applicant: Immersion Corporation, San Jose, CA (US)

(72) Inventors: Danny A. Grant, Laval (CA); Aaron Kapelus, Montreal (CA)

(73) Assignee: Immersion Corporation, San Jose, CA (US)

( * ) Notice: Subject to any disclaimer, the term of this patent is extended or adjusted under 35 U.S.C. 154(b) by 423 days.

(21) Appl. No.: 14/258,644

(22) Filed: Apr. 22, 2014

(65) Prior Publication Data

US 2014/0315642 A1 Oct. 23, 2014

Related U.S. Application Data

(60) Provisional application No. 61/814,628, filed on Apr. 22, 2013.

(51) Int. Cl.
*G06F 3/01* (2006.01)
*A63F 13/20* (2014.01)
(Continued)

(52) U.S. Cl.
CPC .............. *G06F 3/016* (2013.01); *A63F 13/06* (2013.01); *A63F 13/24* (2014.09); *A63F 13/285* (2014.09); *A63F 2300/1037* (2013.01)

(58) Field of Classification Search
CPC ... A63F 13/06; A63F 2300/1037; G06F 3/016
See application file for complete search history.

(56) References Cited

U.S. PATENT DOCUMENTS 6,289,783 B1    9/2001   Sagaser et al.
6,294,859 B1    9/2001   Jaenker
(Continued)

FOREIGN PATENT DOCUMENTS

CN       102974099 A     3/2013
EP        1 259 862 B1    11/2002
(Continued)

OTHER PUBLICATIONS

Extended European Search Report issued in EP Application No. 14 165 388.1, dated Feb. 16, 2017.
(Continued)

*Primary Examiner* — Dmitry Suhol
*Assistant Examiner* — Ankit Doshi
(74) *Attorney, Agent, or Firm* — Medler Ferro Woodhouse Mills PLLC (57) ABSTRACT

A haptic peripheral comprising a housing, a user input element, a position sensor coupled to the user input element, and an actuator located within the housing and coupled to the user input element. The position sensor is configured to detect a position of the user input element and is configured to send the position to a processor. The actuator is configured to receive a haptic effect drive signal from the processor and is configured to output a force in response to the haptic effect drive signal from the processor. The force is transmitted to the user input element as a kinesthetic haptic effect. The haptic peripheral may include a mechanical amplification system coupled to the actuator and configured to increase the force output by the actuator. In such an embodiment, the increased force is transmitted from the mechanical amplification system to the user input element as a kinesthetic haptic effect. The user input element may be a button, joystick, or trigger and is manipulated by a user to interact with a host computer.

18 Claims, 8 Drawing Sheets

(51) Int. Cl.
*A63F 13/24* (2014.01)
*A63F 13/285* (2014.01)

(56) References Cited

U.S. PATENT DOCUMENTS

| | | |
|---|---|---|
| 6,563,487 B2 | 5/2003 | Martin et al. |
| 7,182,691 B1 * | 2/2007 | Schena ............... A63F 13/06 345/161 |
| 7,283,120 B2 | 10/2007 | Grant |
| 7,973,769 B2 | 7/2011 | Olien |
| 8,506,369 B2 | 8/2013 | Grant et al. |
| 8,508,486 B2 | 8/2013 | Grant et al. |
| 2001/0045938 A1 | 11/2001 | Willner et al. |
| 2002/0054011 A1 | 5/2002 | Bruneau et al. |
| 2002/0133174 A1 | 9/2002 | Charles et al. |
| 2002/0190528 A1 | 12/2002 | Ootori |
| 2003/0109314 A1 | 6/2003 | Ku |
| 2004/0137983 A1 | 7/2004 | Kerr |
| 2005/0231476 A1 | 10/2005 | Armstrong |
| 2007/0247031 A1 | 10/2007 | Petersen |
| 2009/0085882 A1 | 4/2009 | Grant et al. |
| 2009/0115292 A1 | 5/2009 | Ueda et al. |
| 2010/0078343 A1 | 4/2010 | Hoellwarth et al. |
| 2010/0081505 A1 | 4/2010 | Alten et al. |
| 2010/0173686 A1 | 7/2010 | Grant et al. |
| 2010/0320870 A1 | 12/2010 | Rahman et al. |
| 2011/0118086 A1 | 5/2011 | Radow et al. |
| 2012/0108335 A1 | 5/2012 | Liotta et al. |
| 2013/0147610 A1 | 6/2013 | Grant et al. |
| 2013/0194085 A1 | 8/2013 | Grant et al. |
| 2015/0018101 A1 | 1/2015 | Schoenith et al. |
| 2015/0133221 A1 | 5/2015 | Danny |

FOREIGN PATENT DOCUMENTS

| | | |
|---|---|---|
| GB | 2492968 A | 1/2013 |
| WO | 99/17850 A2 | 4/1999 |
| WO | 2014/078902 A1 | 5/2014 |

OTHER PUBLICATIONS

EP Appl. No. 14 165 388.1, Partial European Search Report, dated Oct. 12, 2016.

* cited by examiner

GAMING DEVICE HAVING A HAPTIC-ENABLED TRIGGER

CROSS-REFERENCE TO RELATED APPLICATIONS

This application claims the benefit of U.S. Provisional Patent Application Ser. No. 61/814,628, filed Apr. 22, 2013, which is hereby incorporated by reference in its entirety for all purposes.

FIELD OF THE INVENTION

Embodiments hereof relate to devices with targeted actuators coupled to user input elements such that the haptic effect is directed to the user input elements.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with a user input elements to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed devices to alert the user to specific events, or provide realistic feedback to user regarding interaction of the medical device with the patient at the distal end of the medical device.

Conventional haptic feedback systems for gaming and other devices generally include one or more actuators attached to the housing of the controller for generating the haptic feedback. However, these conventional haptic feedback systems create a haptic sensation along the entire body of the controller. Such a device does not provide a targeted or directed haptic sensation to the user for specific actions or locations.

Embodiments hereof relate to a haptic feedback system that provides a kinesthetic haptic effect to the user input element. Further, embodiments hereof relate to a haptic feedback system which produces haptic effects to the user input element that are discernible or distinguishable from general haptic effects produced along the entire body of the device/controller.

BRIEF SUMMARY OF THE INVENTION

Embodiments hereof are directed to a haptic peripheral including a housing, a user input element, a position sensor coupled to the user input element, and an actuator located within the housing and coupled to the user input element. The position sensor is configured to detect a position of the user input element and is configured to send the position to a processor. The actuator is configured to receive a haptic effect drive signal from the processor and is configured to output a force in response to the haptic effect drive signal from the processor. The force is transmitted to the user input element as a kinesthetic haptic effect. The haptic peripheral may include a mechanical amplification system coupled to the actuator and configured to increase the force output by the actuator. In such an embodiment, the increased force is transmitted from the mechanical amplification system to the user input element as a kinesthetic haptic effect.

The haptic peripheral may be a game controller, tablet, phone, personal digital assistant (PDA), computer, gaming peripheral, mouse, wearable user items including an input device, or other devices which include user input elements. The housing of the haptic peripheral is adapted to be held by a user. The user input element may be a button, joystick, or trigger and is manipulated by a user to interact with ahost computer. The processor may be disposed in the host computer or in the controller.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other devices having user input elements.

Figure 1:
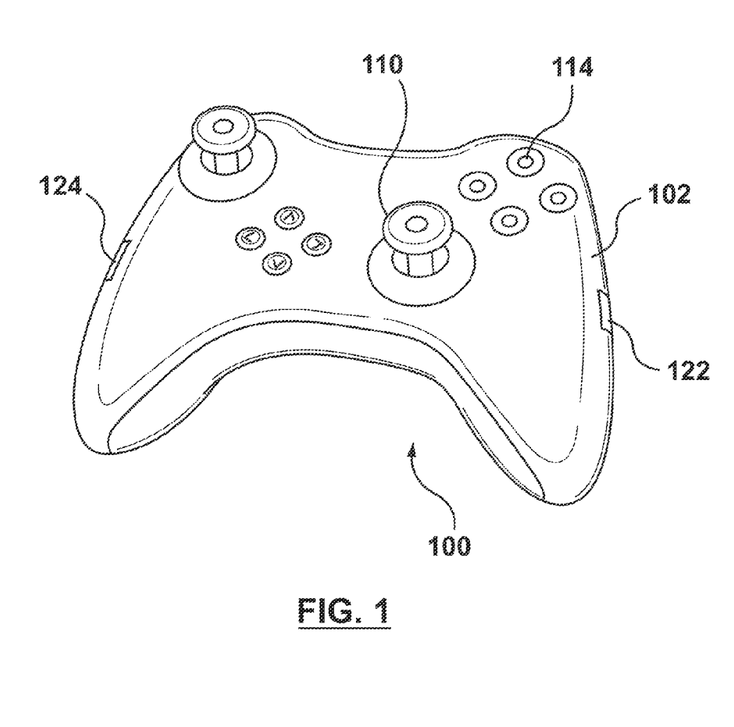
FIG. 1 is a schematic illustration of an embodiment of a controller.
Figure 2:
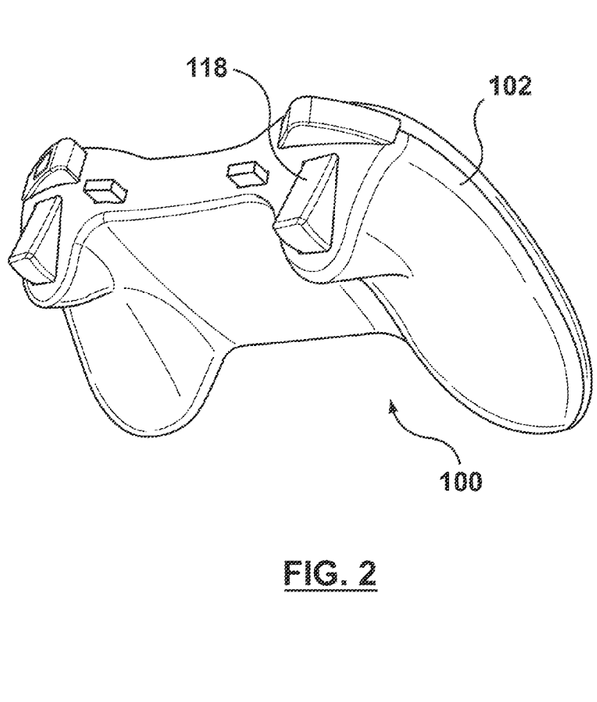
FIG. 2 is a schematic illustration of another view of the controller of FIG. 1.
Figure 6:
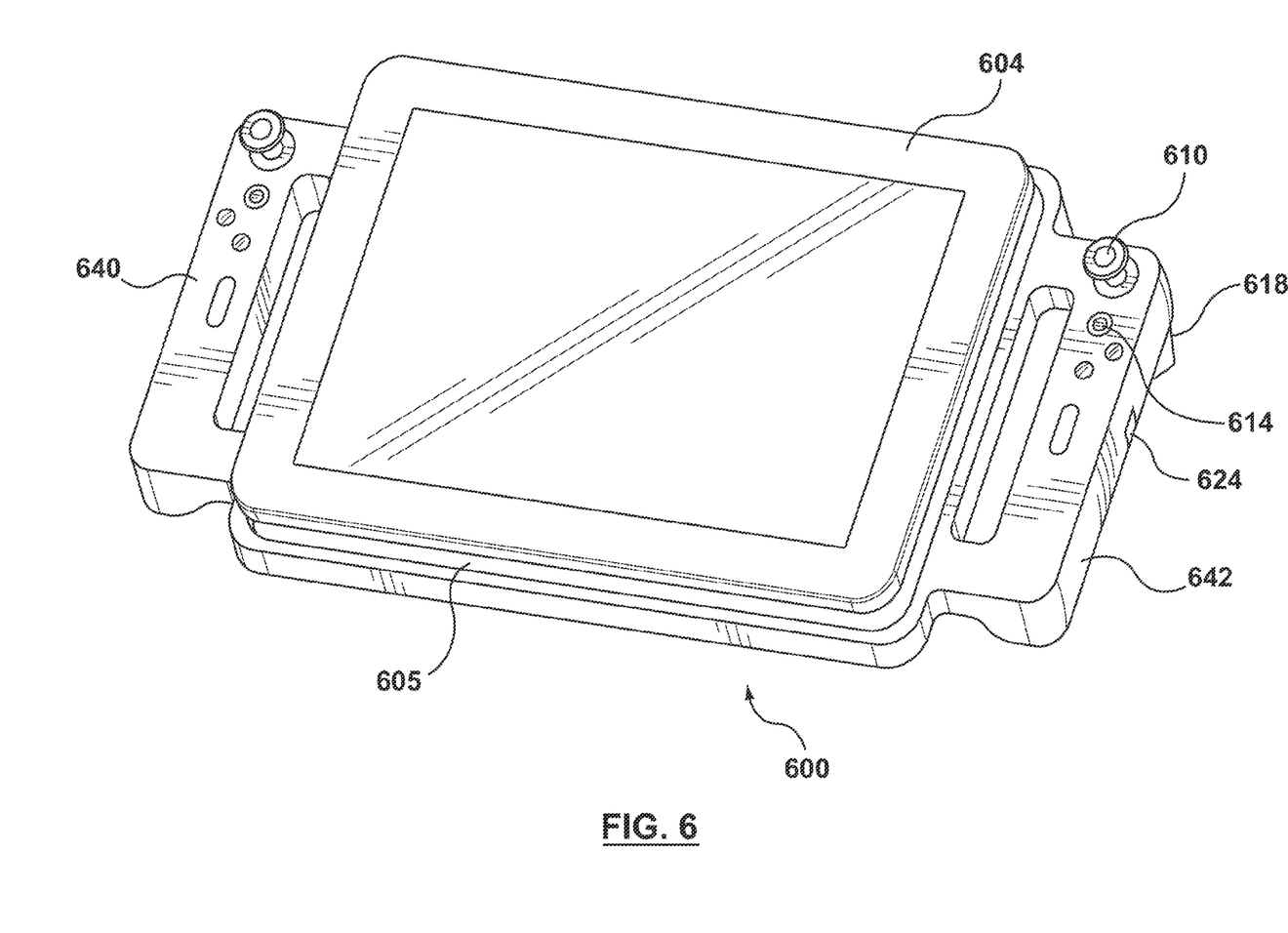
FIG. 6 is a schematic illustration of an embodiment of a gaming tablet.

Embodiments hereof relate to a haptic peripheral of a haptic feedback system, the haptic peripheral including a targeted actuator or motor coupled to a user input element for providing targeted or directed kinesthetic haptic effects directly to the user input element. As used herein, "kinesthetic" haptic effects includes effects in which the targeted actuator applies force to the user input element to move the user input element in directions it would be moved by the user (active of resistive force feedback), thereby resulting in kinesthetic haptic effects that are felt by the user. Kinesthetic haptic effects are distinguishable from inertial haptic effects, in which an inertial actuator outputs or creates a force that may be indirectly felt by the user, i.e., the target is not moved by the actuator but the output force may be indirectly perceived or felt by the user. One haptic feedback system that provides inertial haptic effects to a user input device is disclosed in U.S. patent application Ser. No. 14/078,478, filed Nov. 12, 2013 by one of the same inventors as the present invention, herein incorporated by reference in its entirety. This system describes an inertial actuator attached to the user input element for providing inertial transient effects such as detents or vibrations to the user input element. In order to isolate the inertial haptic effects to a targeted region of the user input element, a vibration isolation/dampening device is utilized with the inertial actuator. Kinesthetic haptic effects as produced by embodiments hereof, however, are felt by the user because the actuator directly drives or pushes/pulls on the user input element to cause movement thereof. In addition, kinesthetic haptic effects produced on user input elements as disclosed in embodiments hereof are discernible or distinguishable from general haptic effects, also referred to as rumble effects, produced along the entire body or housing of the haptic peripheral. The haptic peripheral may be, for example, a handheld gaming controller 100 for a gaming system as shown in FIGS. 1-2, a gaming tablet controller 600 as shown in FIG. 6, or other controllers that having user input (UI) elements such as, but not limited to, phones, personal digital assistants (PDA), tablets, computers, gaming peripherals, and other controllers for gaming systems known to those skilled in the art.

Figure 3:
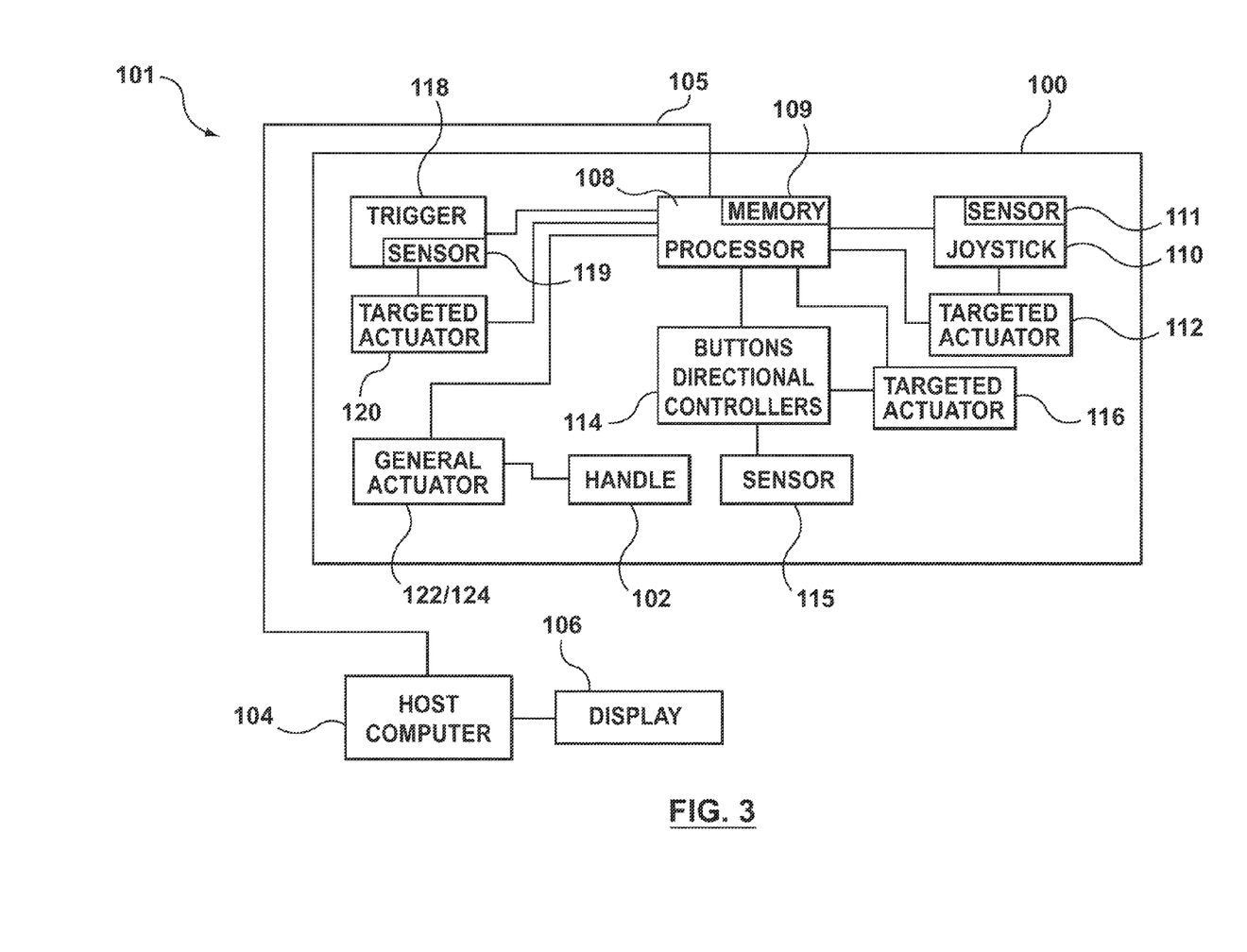
FIG. 3 is a block diagram of the controller of FIG. 1 in conjunction with a host computer and display.

Controller 100 may be generally used with a gaming system that may be connected to a computer, mobile phone, television, or other similar device. FIGS. 1-2 illustrate different perspective views of controller 100, while FIG. 3 illustrates a block diagram of controller 100 used in a gaming system 101 that further includes a host computer 104 and a display 106. As shown in the block diagram of FIG. 3, controller 100 includes a local processor 108 which communicates with host computer 104 via a connection 105. Connection 105 may be a wired connection, a wireless connection, or other types of connections known to those skilled in the art. Controller 100 may be alternatively configured to not include local processor 108, whereby all input/output signals from controller 100 are handled and processed directly by host computer 104. Host computer 104 is coupled to display screen 106. In an embodiment, host computer 104 is a gaming device console and display screen 106 is a monitor which is coupled to the gaming device console, as known in the art. In another embodiment, as known to those skilled in the art, host computer 104 and display screen 106 may be combined into a single device.

A housing 102 of controller 100 is shaped to easily accommodate two hands gripping the device, either by a left-handed user or a right-handed user. Those skilled in the art would recognize that controller 100 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U controller, Sony® SixAxis™ controller or Sony® Wand controller, as well as controllers shaped as real life objects (such as tennis rackets, golf clubs, baseball bats, and the like) and other shapes.

Controller 100 includes several user input elements or manipulandums, including a joystick 110, a button 114, and a trigger 118. As used herein, user input element refers to an interface device such as a trigger, button, joystick, or the like, which is manipulated by the user to interact with host computer 104. As can be seen in FIGS. 1-2 and known to those skilled in the art, more than one of each user input element and additional user input elements may be included on controller 100. Accordingly, the present description of a trigger 118, for example, does not limit controller 100 to a single trigger. Further, the block diagram of FIG. 3 shows only one (1) of each of joystick 110, button 114, and trigger 118. However, those skilled in the art would understand that multiple joysticks, buttons, and triggers, as well as other user input elements, may be used, as described above.

As can be seen in the block diagram of FIG. 3, controller 100 includes a targeted actuator or motor to directly drive each of the user input elements thereof as well as one or more general or rumble actuators 122, 124 coupled to housing 102 in a location where a hand of the user is generally located. More particularly, joystick 110 includes a targeted actuator or motor 112 coupled thereto, button 114 includes a targeted actuator or motor 116 coupled thereto, and trigger 118 includes a targeted actuator or motor 120 coupled thereto. In addition to a plurality of targeted actuators, controller 100 includes a position sensor coupled to each of the user input elements thereof. More particularly, joystick 110 includes a position sensor 111 coupled thereto, button 114 includes a position sensor 115 coupled thereto, and trigger 118 includes a position sensor 119 coupled thereto. Local processor 108 is coupled to targeted actuators 112, 116, 120 as well as position sensors 111, 115, 119 of joystick 110, button 114, and trigger 118, respectively. As will be described in more detail herein, in response to signals received from position sensors 111, 115, 119, local processor 108 instructs targeted actuators 112, 116, 120 to provide directed or targeted kinesthetic effects directly to joystick 110, button 114, and trigger 118, respectively. Such targeted kinesthetic effects are discernible or distinguishable from general or rumble haptic effects produced by general actuators 122, 124 along the entire body of the controller. The collective haptic effects provide the user with a greater sense of immersion to the game as multiple modalities are being simultaneously engaged, e.g., video, audio, and haptics.

Figure 4:
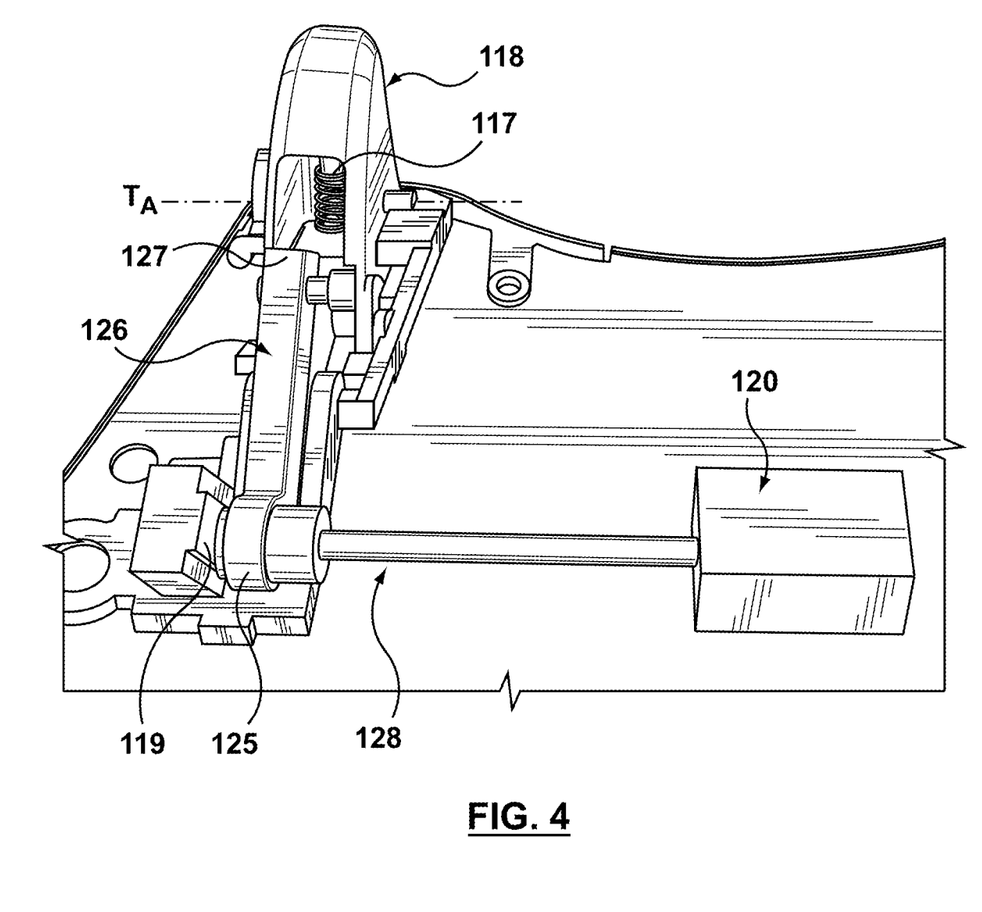
FIG. 4 is a schematic illustration of a portion of the controller of FIG. 1, wherein a housing of the controller is removed to illustrate the internal components thereof.

Turning now to FIG. 4, which is a schematic illustration of a portion of controller 100 with housing 102 removed to illustrate the internal components thereof, the structural relationship between trigger 118, position sensor 119, and targeted actuator or motor 120 will be described in more detail. Although not shown, it will be understood by those of ordinary skill in the art that trigger 118, position sensor 119, and targeted actuator or motor 120 are positioned or housed within housing 102. Further, although only trigger 118 is shown in FIG. 4, those skilled in the art would understand that a similar structural relationship may be used with respect to joystick 110, position sensor 111, and targeted actuator or motor 112 as well as to button 114, position sensor 115, and targeted actuator or motor 116 in order to produce targeted or directed haptic effects to the selected user input element.

Position sensor 119 is configured to detect a position of trigger 118 and is configured to send the position to local processor 108 (not shown in FIG. 4). In the embodiment of FIG. 4, trigger 118 includes a spring element 117 housed therein that returns the trigger to a nominal position without user force applied thereto. Position sensor 119 is coupled to trigger 118 via a lever arm 126 having a hinged first end 125 and a moveable second end 127. Trigger 118 is attached to moveable second end 127 of lever arm 126, and position sensor 119 is attached to hinged first end 125 of lever arm 126. When a user moves or presses on trigger 118, spring element 117 compresses and trigger 118 rotates around or about a trigger axis $T_A$. Second end 127 of lever arm 126 also moves or rotates with trigger 118 and lever arm 126 rotates around or about hinged first end 125. Position sensor 119 detects a change in the rotational position of lever arm 126 and trigger 118 as a movement event, and sends the movement event to local processor 108. As will be explained in more detail herein, different trigger positions and movement events may result in different haptic effects being applied by targeted actuator or motor 120. In an embodiment, position sensor 119 is a potentiometer but may be other types of position sensors known in the art such as but not limited to optical sensors, optical encoders, hall-effect sensors, capacitive sensors, and the like. In another embodiment hereof (not shown), position sensor 119 may be coupled directly to trigger 118 without a lever arm extending therebetween.

Although position sensor 119 detects a change in the rotational position of lever arm 126 and trigger 118, it will be understood by one of ordinary skill in the art that position sensors 115, 111 coupled to button 114, joystick 110, respectively, would be configured to detect movement events of the particular user input element rather than rotational movement as shown with respect to trigger 118. For example, position sensor 115 of button 114 would be configured to detect linear motion or translation of button 114, i.e., when button 114 is pressed down. Position sensor 111 of joystick 110 would be configured to detect motion of joystick 110 within one or more degrees of freedom, i.e., when joystick 110 is physically moved forward, backwards, left or right.

Targeted actuator or motor 120 is coupled to trigger 118 via a rotatable shaft 128. More particularly, rotatable shaft 128 is attached to targeted actuator 120 and extends therefrom to first end 125 of lever arm 126. Rotatable shaft 128 is attached to first end 125 of lever arm 126 such that rotation of shaft 128 causes movement of lever arm 126. Targeted actuator 120 receives a haptic effect drive signal from local processor 108 (not shown in FIG. 4), the haptic effect drive signal having been generated in response to the position of trigger 118 as measured by position sensor 119. Targeted actuator 120 then outputs a haptic effect to trigger 118 in response to the haptic effect drive signal from local processor 108. More particularly, targeted actuator 120 directly drives or causes actuation or rotation of rotatable shaft 128. Rotation of rotatable shaft 128 also causes rotation and movement of lever arm 126 and trigger 118, with the movement of trigger 118 being felt by the user. Thus, actuation or rotation of rotatable shaft 128 is transferred to trigger 118.

In an embodiment hereof, targeted actuator 120 is a bidirectional motor that may push and pull trigger 118, i.e., move trigger 118 in opposing directions. In addition to a motor, targeted actuator 120 may be shape memory alloys, electro-active polymers that deform in response to signals, mechanisms for changing stiffness, vibrotactile actuators, inertial actuators, piezoelectric actuators, or other types of actuating devices suitable for producing kinesthetic haptic effects directly to the user input element. In an embodiment, targeted actuator 120 is a 16 mm Maxon motor but may be other types of brushed and brushless electric DC motors known and available in the art. The stall torque of targeted actuator 120 determines the maximum amount of force that can be applied to trigger 118, with stall torque being measured as the maximum force of targeted actuator 120 from rest. Targeted actuator 120 may have a stall torque between 0.5 mNm and 40 mNm. In an embodiment hereof, targeted actuator 120 has a stall torque of 34.5 mNm when driven at 12V or a stall torque of 14.4 mNm when driven at 5V. As will be understood by those of ordinary skill in the art, strong or high torque motors may produce relatively stronger haptic effects that may be clearly felt and differentiated from general or rumble haptic effects. In addition, high torque motors (such as a motor having a stall torque of 34.5 mNm when driven at 12V or a stall torque of 14.4 mNm when driven at 5V) may produce a wider range of haptic effects that may be clearly felt and differentiated from each other on trigger 118 without mechanical amplification. However, weak or low torque motors are generally less expensive and smaller in size. As will be explained in more detail below with respect to FIG. 5, mechanical amplification such as a gear system may be utilized with a low torque motor to produce stronger haptic effects as well as a wider range of haptic effects.

In operation, local processor 108 detects or receives trigger positions and/or movement events from position sensor 119 and sends the trigger positions and/or movement events to host computer 104. Local processor 108 then provides haptic effect drive signals to targeted actuator 120 based on high level supervisory or streaming commands from host computer 104. For example, when in operation, voltage magnitudes and durations are streamed from host computer 104 to controller 100 where information is provided to targeted actuator 120 via local processor 108. Host computer 104 may provide high level commands to local processor 108 such as the type of haptic effect to be output (e.g. vibration, jolt, detent, pop, etc.) by targeted actuator 120, whereby the local processor 108 instructs targeted actuator 120 as to particular characteristics of the haptic effect which is to be output (e.g. magnitude, frequency, duration, etc.). Local processor 108 may retrieve the type, magnitude, frequency, duration, or other characteristics of the haptic effect from a memory 109 coupled thereto (shown in the block diagram of FIG. 3).

A wide variety of kinesthetic haptic effects or sensations may be output to trigger 118. More particularly, targeted actuator 120 directly drives or pushes/pulls on trigger 118 to cause movement thereof. Targeted actuator 120 may output resistive force on trigger 118, thereby making it more difficult for a user to press down on trigger 118. Such resistive force may be variable, i.e., vary according to trigger position or user actions in a video game. In an embodiment hereof, targeted actuator 120 may output a maximum resistive force which impedes all user motion in a lock-out mode of trigger 118. In another example, targeted actuator 120 may output a detent on trigger 118 by outputting a resistive force on trigger 118 which is removed at one or more particular trigger positions or locations. As such, the detent felt by the user resembles a button click. In yet another embodiment hereof, targeted actuator 120 may output a vibration on trigger 118 by rapidly pushing and pulling trigger 118 back and forth.

In an embodiment hereof, the kinesthetic haptic effects described above are transient, short haptic effects meaning that they are only temporary and of short duration. For example, such effects may each have a duration between 10 milliseconds and 100 milliseconds. As such, targeted actuator 120 has lower power and limited output compared to actuators utilized in full kinesthetic joysticks. Full kinesthetic joysticks continuously consume power in order to provide haptic effects to the joystick. However, a controller having a targeted actuator for providing kinesthetic haptic effects directly to the user input element as described above only consumes power when the haptic effects needs to be applied or changed. Stated another way, with respect to a controller having a targeted actuator for providing transient kinesthetic haptic effects directly to the user input element according to embodiments hereof energy is only required from targeted actuator 120 when the haptic effects needs to be applied or changed as opposed to a full kinesthetic joystick in which power or energy is directly or continuously supplied to render the haptic effects relating to the joystick. As such, a controller having a targeted actuator for providing transient kinesthetic haptic effects directly to the user input element according to embodiments hereof has relatively lower power requirements, thereby reducing cost, volume, and power consumption. In addition, the size of the actuators utilized in embodiments hereof are relative smaller and less expensive than those utilized in full kinesthetic joysticks as they require less peak power to be delivered.

Exemplary applications in which targeted haptic feedback is advantageous include a first person shooter video game or a racing video game. In such video games, targeted actuator 120 may output a haptic effect such as a vibration, jolt or pop when the user hits the target in the shooter video game example or passes a milestone or marker in the racing video game example. In another example, targeted actuator 120 may output a detent at variable locations in the racing video game example or a detent as feedback for repeat firing in the shooter video game example. Texture feedback may be created with position dependent haptic algorithms such as but not limited to granular synthesis. In another example, targeted actuator 120 may be used output haptic feedback to indicate a status of the video game such as out of ammunition, incorrect range of a weapon, which weapon is being used, and/or firing rates. In a video game in which multiple weapons may be utilized, such status indications assist a user in learning the optimal firing rate and trigger position/point for each weapon. Other examples include that targeted actuator 120 may output detents at variable trigger positions or locations, may output a programmable "feel" or resistance for each weapon, may output firing results in feedback, may output brake or throttle feedback by increasing or decreasing the applied resistance, may output texture feedback, may increase or decrease stiffness of spring 117 and therefore trigger 118, and may simulate inertia.

As previously stated, different trigger positions and movement events may result in different kinesthetic haptic effects being applied by targeted actuator 120. For example, a first position of trigger 118 results in targeted actuator 120 generating and applying a first haptic effect drive signal to trigger 118, while a second position of trigger 118 results in targeted actuator 120 generating and applying a second haptic effect drive signal to trigger 118. More particularly, depending on game actions and the position of trigger 118 as indicated by position sensor 119, local processor 108 may send a haptic effect drive signal to targeted actuator 120 to output one of a wide variety of haptic effects or sensations, including vibrations, detents, textures, jolts or pops. Further, the strength or level of the haptic effect or sensation may vary depending on the position of trigger 118 as indicated by position sensor 119.

Kinesthetic haptic effects may also vary according to user input element. For example, some shooting games include two triggers having separate or corresponding targeted actuators. A first haptic effect drive signal may be applied to a first trigger by a first targeted actuator and a second haptic effect drive signal may be applied to a second trigger by a second targeted actuator. For example, in some video games such as but not limited to Titanfall, the haptic effect drive signals for each trigger (i.e., the left trigger and the right trigger) correspond to different types of weapons that are being held by the left and right hand of the computer controlled character or object. In another example, the haptic effect drive signals for each trigger (i.e., the left trigger and the right trigger) correspond to directional events happening to the left and right sides of the computer controlled character or object (i.e., a left side of the character is bumped or hit by something in the video game).

Advantageously, targeted actuator 120 provides a variety of kinesthetic haptic effects or sensations to trigger 118 that are independent of and complementary to general or rumble haptic feedback produced by general actuators 122, 124. General actuators 122, 124 are coupled to housing 102 of controller 100, and serve to provide the entire housing of controller 100 with general or rumble haptic feedback. General actuators 122, 124 are coupled to and receive control signals from processor 108 in a manner similar to targeted actuator or motor 120 in which local processor 108 provides haptic effect control signals to general actuators 122, 124 based on high level supervisory or streaming commands from host computer 104. For example, when in operation, voltage magnitudes and durations are streamed from host computer 104 to controller 100 where information is provided to general actuators 122, 124 via local processor 108. Host computer 104 may provide high level commands to local processor 108 such as the type of haptic effect to be output (e.g. vibration, jolt, detent, pop, etc.) by general actuators 122, 124, whereby the local processor 108 instructs general actuators 122, 124 as to particular characteristics of the haptic effect which is to be output (e.g. magnitude, frequency, duration, etc.).

General actuators 122, 124 may include electromagnetic motors, eccentric rotating mass ("ERM") actuators in which an eccentric mass is moved by a motor, linear resonant actuators ("LRAs") in which a mass attached to a spring is driven back and forth, shape memory alloys, electro-active polymers that deform in response to signals, mechanisms for changing stiffness, vibrotactile actuators, inertial actuators, piezoelectric actuators, or other suitable types of actuating devices. In one embodiment, actuators 122, 124 can be implemented as an inertial actuator to provide vibrotactile feedback to the user. In another embodiment, the actuators may use kinesthetic haptic feedback including, for example, solenoids to change the stiffness/damping of housing 202, small air bags that change size in housing 202, or shape changing materials.

Figure 5:
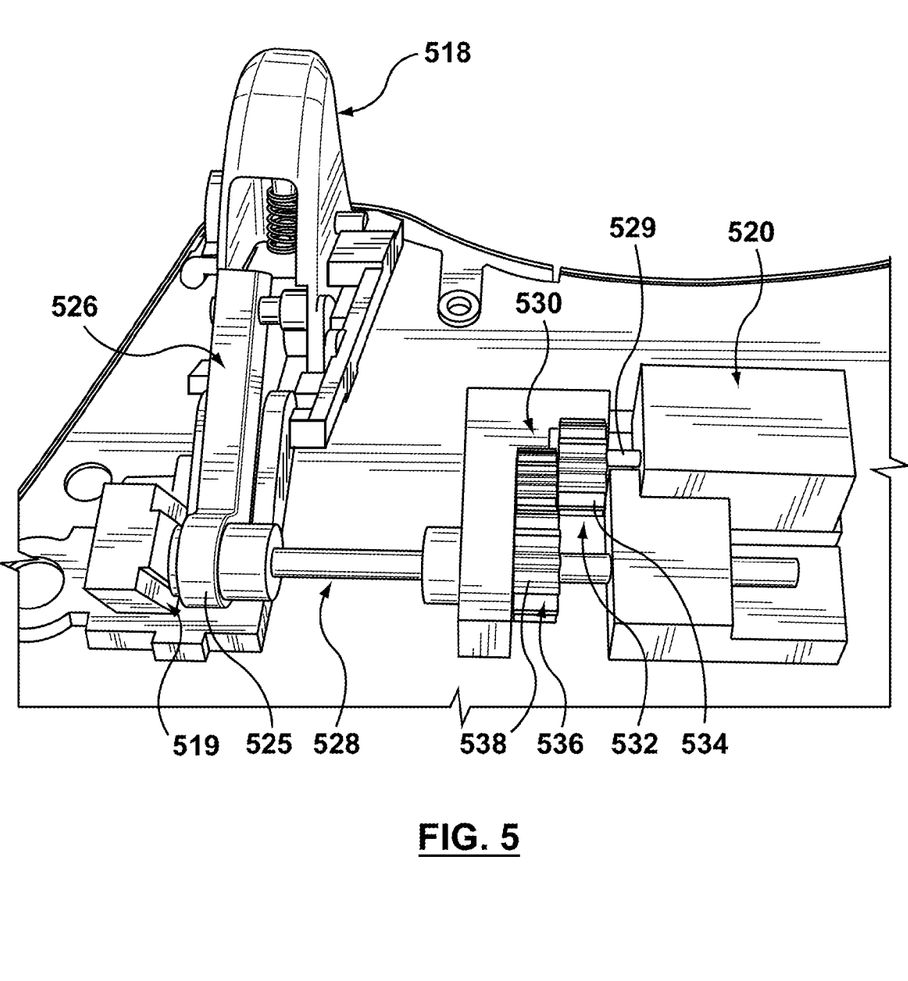
FIG. 5 is a schematic illustration of a portion of a controller according to another embodiment hereof, wherein a housing of the controller is removed to illustrate the internal components thereof.

As stated above, in embodiments hereof in which a low stall torque motor is utilized as a targeted actuator, mechanical amplification such as a gear system may be utilized to produce sufficient haptic effects that can be felt by the user. FIG. 5 illustrates another embodiment hereof in which a controller 500 includes a gear mechanism 530 to increase stall torque and haptic strength of a targeted actuator or motor 520. In addition to motor 520 and gear mechanism 530, controller 500 includes trigger 518, position sensor 519, and a processor (not shown in FIG. 5) for receiving the trigger position and movement events from position sensor 519 and outputting haptic effect drive signals to motor 520. Although not shown, it will be understood by those of ordinary skill in the art that a trigger 518, position sensor 519, and targeted actuator or motor 520 are positioned or housed within a housing. Similar to FIG. 4, FIG. 5 is a schematic illustration of a portion of a controller 500 within a housing thereof removed to illustrate the internal components of the controller.

Gear mechanism 530 includes at least a first rotatable gear 532 having teeth or cogs 534 around an outer circumference thereof and a second rotatable gear 536 having teeth or cogs 538 around an outer circumference thereof. First gear 532 is coupled to motor 520 via a first rotatable shaft 529, which is attached to and extends from motor 520. Second gear 536 is coupled to a first end 525 of a lever arm 526, which is attached to trigger 518, via a second rotatable shaft 528. First gear 532 is relatively smaller than second gear 534, and teeth 534 of first gear 532 mesh with teeth 538 of second gear 536. As will be understood by those of ordinary skill in the art, gears 532, 536 produce a mechanical advantage through a gear ratio in order to change or increase the torque produced from motor 520. A high gear ratio of gear mechanism 530 result in high increases or changes in the motor stall torque, which corresponds to an increase in transmission forces from motor 520. However, high gear ratios also result in high inertia in the output of gear mechanism 530, which may reduce system response time and perception of haptic effects. Thus, various factors including cost, size, desired stall torque, desired response time, and desired strength of the haptic effects must be considered when selecting motor 520 and the corresponding gear ratio required for gear mechanism 530. In an embodiment hereof, a gear ratio between 2:1 to 28:1 is used. For example, a gear ration of 9:1 is required for a motor having 2.1 mNm stall torque. Although FIG. 5 illustrates a gear mechanism as means for mechanical amplification of a low stall torque motor, other means of mechanical amplification may be utilized such as but not limited to pulley mechanisms.

Figure 7:
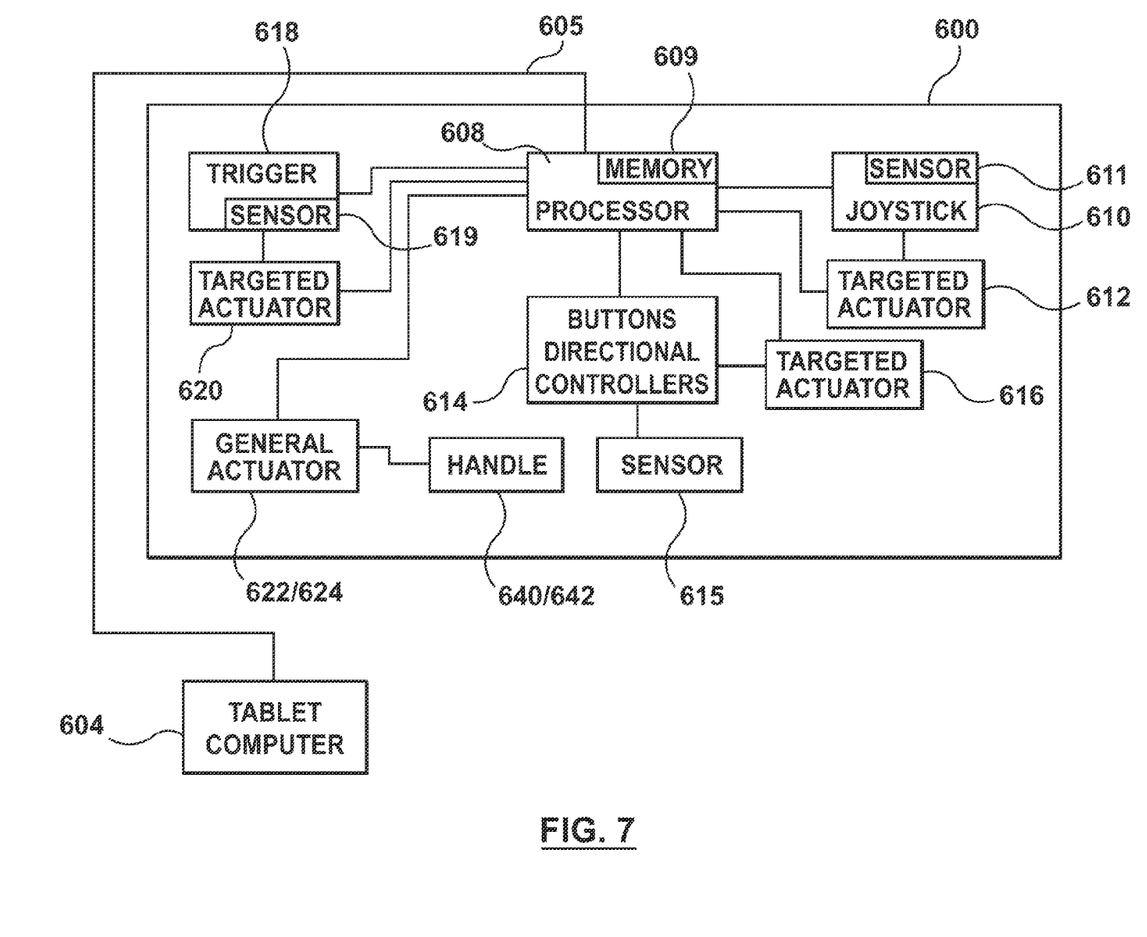
FIG. 7 is a block diagram of the gaming table of FIG. 6.

Several embodiments are specifically illustrated and/or described herein. However, it will be appreciated that modifications and variations of the disclosed embodiments are covered by the above teachings and within the purview of the appended claims without departing from the spirit and intended scope of the invention. For example, FIGS. 1-3 illustrate a haptic peripheral which is a handheld gaming controller of similar shape and size to many "gamepads" currently available for video game console systems. However, those skilled in the art would recognize that the controller is merely an exemplary embodiment of a haptic peripheral and that haptic peripherals with other configurations, shapes, and sizes may be used. For example, FIGS. 6-7 illustrate another embodiment hereof in which the haptic peripheral is a gaming tablet controller 600 that may be used with a tablet computer 604. Tablet computer 604 may be designed specifically for gaming activities, such as is available from Razer Inc., or may be a tablet computer well known and available in the market, such as an Apple® Ipad®, Kindle® Fire®, and Samsung® Galaxy Tab®.

Gaming tablet controller 600 includes a docking portion 605 configured to receive tablet computer 604 and handles 640, 642 with user input elements disposed thereon for a user to control a game on tablet computer 604. Docking portion 605 connects gaming tablet controller 600 to tablet computer 604 such that actions by the user on handles 640, 642 such as pressing buttons, moving joysticks, pressing triggers, etc., result in actions on the game being played on tablet computer 604.

Handles 640, 642 include typical user input elements found on controllers. The user input elements will be described with respect to handle 642. However, those skilled in the art would recognize that the same or similar user input elements may be used on handle 640. In particular, handle 642 includes a joystick 610, a button 614, and a trigger 618. As can be seen in FIG. 6 and known to those skilled in the art, more than one of each of these user input elements may be included on each handle 640, 642. Further, handle 642 includes a general or rumble actuator 624 attached thereto in a location where a hand of the user is generally located for providing general or rumble haptic effects to gaming tablet controller 600 as described above with respect to general or rumble actuators 122, 124.

FIG. 7 illustrates a block diagram of the gaming tablet controller of FIG. 6 in accordance with an embodiment. As shown in FIG. 7, gaming tablet controller 600 includes a local processor 608 which communicates with tablet computer 604 via docking portion 605. Other connections, such as wired or wireless connections, may be used instead of docking portion 605. Tablet computer 604 in this embodiment includes a display screen. Gaming tablet controller 600 may be alternatively configured to not include local processor 608, whereby all input/output signals from gaming tablet controller 600 are handled and processed directly by tablet computer 604.

Local processor 608 is coupled to joystick 610, button 614, and trigger 618, and to position sensors 611, 615, and 619 that may be coupled to joystick 610, buttons 614, and trigger 618, respectively. The block diagram of FIG. 7 shows only one (1) of each of joystick 610, button 614, and trigger 618. However, those skilled in the art would understand that multiple joysticks, buttons, and triggers, as well as other user input elements, may be used, as described above. Targeted actuators or motors 612, 616, and 620 are coupled to joystick 610, button 614, and trigger 618, respectively. Targeted actuators 612, 616, 620 and general actuators 622, 624 are also coupled to local processor 608, which provides haptic effect drive signals to the actuators 612, 616, 620, 622, 624 based on high level supervisory or streaming commands from tablet computer 604. In the streaming embodiment, the voltage magnitudes and durations are streamed to gaming tablet controller 600 where information is provided by the tablet computer 604 to the actuators. In operation, tablet computer 604 may provide high level commands to the local processor 608 such as the type of haptic effect to be output (e.g. vibration, jolt, detent, pop, etc.) by one or more selected actuators, whereby local processor 608 instructs the actuator as to particular characteristics of the haptic effect which is to be output (e.g. magnitude, frequency, duration, etc.). Local processor 608 may retrieve the type, magnitude, frequency, duration, or other characteristics of the haptic effect from a memory 609 coupled to local processor 608. The haptic effects provide the user with a greater sense of immersion to the game as multiple modalities are being simultaneously engaged, e.g., video, audio, and haptics.

Figure 8:
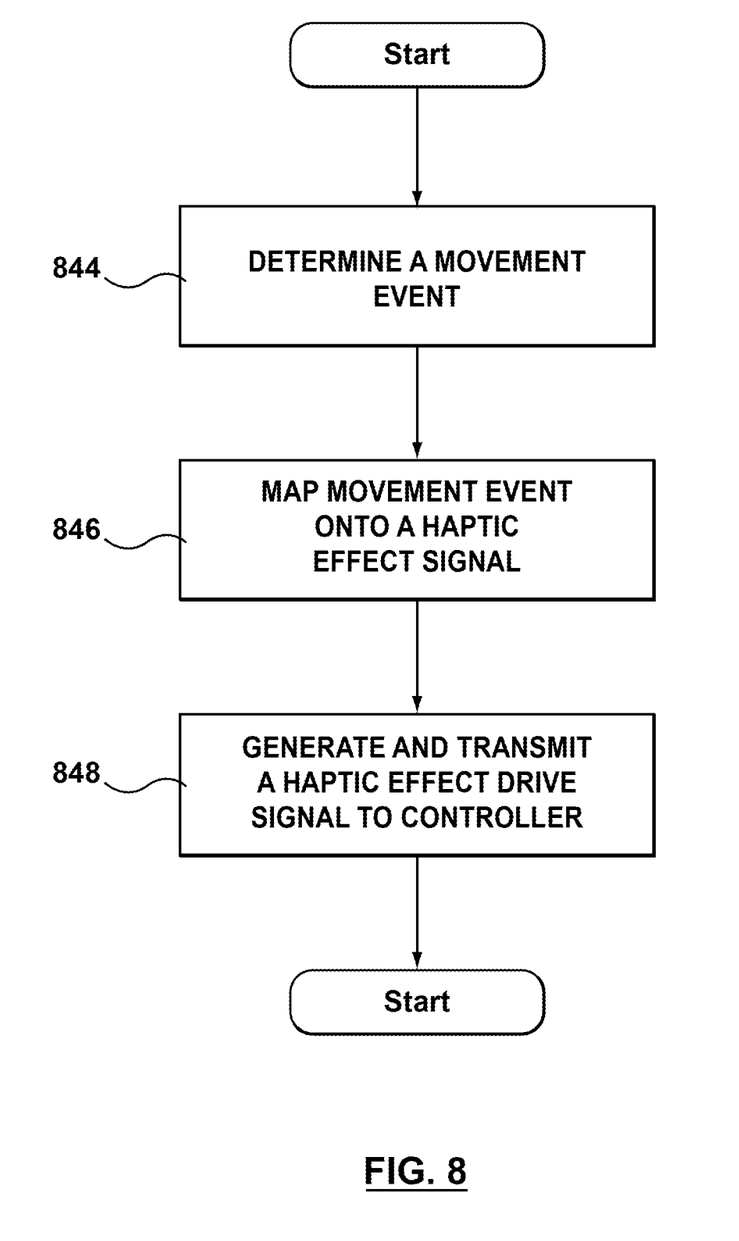
FIG. 8 is a flow chart illustrating a method for determining and transmitting a haptic signal from a host device according to an embodiment hereof.

FIG. 8 is a flow diagram for producing a haptic effect drive signal from the host computer system, i.e., host computer 104 or tablet computer 604, according to one embodiment of the present invention. For sake of illustration, the flow diagram will be described with reference to host computer 104 and controller 100. In an embodiment, the functionality of the flow diagram of FIG. 8 is implemented by software stored in the memory of host computer 104 and executed by processor of host computer 104, and/or memory 109 of controller 100 and executed by local processor 108 of controller 100. In other embodiments, the functionality may be performed by hardware through the use of an application specific integrated circuit ("ASIC"), a programmable gate array ("PGA"), a field programmable gate array ("FPGA"), or any combination of hardware and software.

At step 844, host computer 104 determines or detects a movement event of trigger 118. More particularly, host computer 104 determines whether a movement event has occurred based on a position signal sensed by position sensor 119 attached to trigger 118. As an example, a user may depress or press down on trigger 118 in order to fire a weapon in a shooting game example or to accelerate a car in a racing video game example. One of ordinary skill in the art would understand that movement events of trigger 118 are not limited to the examples stated above.

At step 846, host computer 104 then determines whether there is an associated haptic effect with the movement event. For example, in a shooting video game scenario, firing a weapon may have an associated haptic effect such as a vibration, jolt or pop and repeat firing may have associated haptic effects such as detents. For another example, in a racing video game scenario, accelerating or braking a car may have an associated haptic effect such as a texture change and passing a milestone or marker may have an associated haptic effect such as a vibration, jolt, pop, or detent.

In order to determine whether there is an associated haptic effect with the movement event, host computer 104 maps the movement event onto a haptic effect signal for targeted actuator 120. More particularly, host computer accesses a pre-defined mapping of movement events and haptic effects. If it is determined that the movement event has an associated haptic effect, then a haptic signal will be sent. If it is determined that the movement event does not have an associated haptic effect, then no haptic signal will be sent.

At step 848, host computer 104 sends haptic control information to controller 100 by generating and transmitting a haptic effect drive signal based on the haptic effect signal. The transmission of the haptic effect drive signal can be done either through wired or wireless communication, as previously described.

FIG. 8 illustrates one method for producing a haptic effect drive signal from the host computer system based on detection of a movement event. However, in an embodiment hereof, detection of a movement event is not required for producing a haptic effect drive signal from the host computer system. Stated another way, the host computer system may generate and transmit a haptic effect drive signal to controller 100 without detection of a movement event. For example, the host computer system may generate and transmit a haptic effect drive signal to controller 100 based on events relating to the computer controlled character or object (i.e., the character's hand is bumped or hit by something in the video game and a haptic effect is output to the user input element to signify this event).

Figure 9:
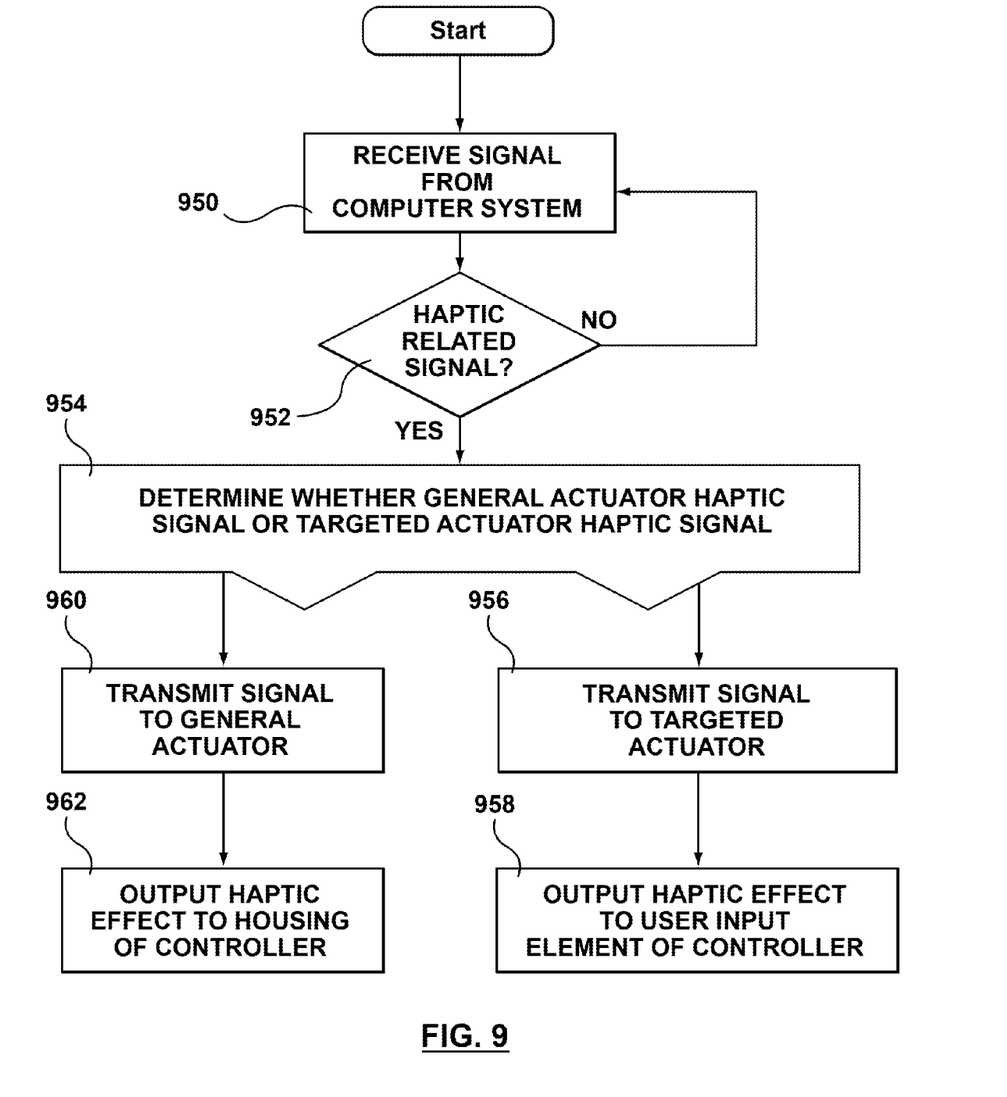
FIG. 9 is a flow chart illustrating a method for providing haptic effects to a user of a controller according to an embodiment hereof.

FIG. 9 is a flow diagram for receiving haptic information from a host computer system and applying a haptic effect to a controller, according to one embodiment of the present invention. In an embodiment, the functionality of the flow diagram of FIG. 9 is implemented by software stored in the memory of host component 104 and executed by the processor of host computer 104, and/or memory 109 of controller 100 and executed by local processor 108 of controller 100. In other embodiments, the functionality may be performed by hardware through the use of an application specific integrated circuit ("ASIC"), a programmable gate array ("PGA"), a field programmable gate array ("FPGA"), or any combination of hardware and software.

At step 950, the haptic peripheral receives a signal from host computer 104. Upon receiving the signal, local processor 108 then determines whether the signal is a haptic signal at step 952 or some other non-haptic related signal. If it is determined that the signal is not a haptic signal, local processor 108 continues to function without applying any haptic effect to the user and waits to receive another signal from the host computer. If it is determined that the signal is a haptic signal, local processor 108 then must determine to which component, i.e., housing 102 or a user input element, the signal must be sent.

At step 954, local processor 108 must determine if the haptic related signal is a general actuator haptic signal or a targeted actuator haptic signal. If the signal calls for one of general actuators 122, 124 to provide a general or rumble haptic effect to the user, then local processor 108 will send the signal to the appropriate general actuators 122, 124 at step 960 and then the general actuator will output the instructed haptic effect at step 962. The haptic effects that are output by the general actuator can include but are not limited to varying degrees of vibrations or other types of haptic effects. As an illustrative example, if a user is controlling a character or some other graphical object and then encounters a collision in the virtual environment, the associated haptic effect might be a vibration. In this case, local processor 108 receives a signal indicating that housing 102 of controller 100 should vibrate. As a result, local processor 108 sends the signal to the appropriate actuator 122, 124 to provide the appropriate haptic effect, which in this example is a vibration.

However, if the signal calls for one of the targeted actuators 112, 116, 120 to output a targeted haptic effect to button 110, joystick 114, trigger 118, respectively, then local processor 108 will send the signal to the targeted actuator at step 956 and then the targeted actuator will output the instructed haptic effect at step 958. The haptic effects that are output by the targeted actuator can include but are not limited to varying degrees of vibrations, varying degrees of detents, or other types of haptic effects.

In determining the type of haptic effects to be executed and provided to the user, high level haptic parameters or streaming values are generated in the software code and sent to a haptic engine (not shown) where they are processed and the appropriate voltage levels are generated for the actuators. This allows the controller to provide the appropriate haptic feedback to the user and vary the amount or type of haptic feedback through the different voltage levels that are generated for the actuators. In addition, the gaming software and the haptic software can reside on the same processor or on multiple processors.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. For example, although described for use in conjunction with controllers having general or rumble actuators, it will be understood by those of ordinary skill in the art that targeted actuators or motors as described herein for outputting targeted or directed haptic effects to user input elements may be used in controllers that do not include general or rumble actuators for outputting haptic effects to the housing of the controller. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic peripheral comprising:
a housing;
a user input element;
a position sensor coupled to the user input element, wherein the position sensor is configured to detect a position of the user input element and is configured to send the position to a processor;
an actuator located within the housing and coupled to the user input element, wherein the actuator is configured to receive a haptic effect drive signal from the processor and is configured to output a force in response to the haptic effect drive signal from the processor; and
a mechanical amplification system coupled to the actuator, the mechanical amplification system being a gear system configured to increase the force output by the actuator, wherein the increased force is transmitted from the mechanical amplification system to the user input element as a kinesthetic haptic effect.

2. The haptic peripheral of claim 1, wherein the user input element is selected from the group consisting of a button, a trigger, and a joystick.

3. The haptic peripheral of claim 1, wherein the processor is located within the housing of the haptic peripheral.

4. The haptic peripheral of claim 1, wherein the processor is remotely located from the housing of the haptic peripheral.

5. The haptic peripheral of claim 1, wherein the actuator is coupled to the user input element via a rotatable shaft and wherein the actuator applies the force output in response to the haptic effect drive signal to the user input element via rotation of the rotatable shaft.

6. The haptic peripheral of claim 1, wherein the actuator is a bidirectional motor.

7. The haptic peripheral of claim 1, wherein the kinesthetic haptic effect is selected from the group consisting of a detent, a vibration, or a texture.

8. The haptic peripheral of claim 1, wherein the position sensor is rotatable about an axis and is coupled to the user input element via a lever arm.

9. The haptic peripheral of claim 1, wherein the haptic effect drive signal is generated by the processor in response to the position of the user input element.

10. The haptic peripheral of claim 1, further comprising:
a rumble actuator coupled to the housing, wherein the rumble actuator is configured to receive a second haptic effect control signal from the processor and output a second haptic effect to the housing in response to the second haptic effect control signal received from the processor.

11. The haptic peripheral of claim 1, wherein a first position of the user input element results in the actuator generating and applying a first force output in response to a first haptic effect drive signal to the user input element and a second position of the user input element results in the actuator generating and applying a second force output in response to a second haptic effect drive signal to the user input element, the first position being different than the second position and the first haptic effect drive signal being different than the second haptic effect drive signal.

12. A haptic peripheral comprising:
a housing;
a trigger which is rotatable about an axis;
a lever arm having a hinged first end and a moveable second end, wherein the trigger is attached to the moveable second end of the lever arm;
a position sensor attached to the hinged first end of the lever arm, wherein the position sensor is configured to detect a change in a rotational position of the trigger as a movement event and is configured to send the movement event to a processor;
a bidirectional motor located within the housing, wherein the bidirectional motor is configured to receive a haptic effect drive signal from the processor and is configured to output a force in response to the haptic effect drive signal from the processor;
a rotatable shaft attached to the bidirectional motor and extending therefrom to the hinged first end of the lever arm, wherein the rotatable shaft is attached to the hinged first end of the lever arm such that rotation of the rotatable shaft causes movement of the lever arm and the trigger; and
a gear system disposed between the bidirectional motor and the rotatable shaft, the gear system being configured to increase the force output by the bidirectional motor, wherein the increased force is transmitted from the gear system to the trigger as a kinesthetic haptic effect.

13. A gaming system comprising:
a host computer;
a processor;
a controller having a housing, a user input element, and a position sensor coupled to the user input element; and
an actuator coupled to the user input element via a mechanical amplification system, the mechanical amplification system being a gear system, wherein the position sensor is configured to detect a position of the user input element and send the position to the processor, the actuator is configured to receive a haptic effect drive signal from the processor and is configured to output a force in response to the haptic effect drive signal from the processor, and the mechanical amplification system is configured to increase the force output by the actuator, the increased force being transmitted from the mechanical amplification system to the user input element as a kinesthetic haptic effect.

14. The gaming system of claim 13, wherein the host computer is a tablet computer and the controller includes a handle and a docking station adapted to receive the tablet computer therein, wherein the user input element is disposed on the handle.

15. The gaming system of claim 13, wherein the processor is disposed in the controller.

16. The gaming system of claim 13, wherein the processor is disposed in the host computer.

17. The gaming system of claim 13, wherein the user input element is selected from the group consisting of a button, a trigger, and a joystick.

18. The gaming system of claim 13, wherein the controller also includes a rumble actuator coupled to the housing, wherein the rumble actuator is configured to receive a second haptic effect control signal from the processor and output a second haptic effect to the housing in response to a second haptic effect control signal received from the processor.

* * * * *